(12) United States Patent
Lee et al.

(10) Patent No.: US 12,257,820 B2
(45) Date of Patent: Mar. 25, 2025

(54) MULTILAYERED FLOORING DECORATIVE MATERIAL

(71) Applicant: KCC Glass Corporation, Seoul (KR)

(72) Inventors: Deuk Soo Lee, Chungcheongnam-do (KR); Sang Hyun Lee, Chungcheongnam-do (KR); Byeong Ro Jung, Chungcheongbuk-do (KR); Jang Wook Kim, Gyeonggi-do (KR)

(73) Assignee: KCC Glass Corporation, Seoul (KR)

( * ) Notice: Subject to any disclaimer, the term of this patent is extended or adjusted under 35 U.S.C. 154(b) by 209 days.

(21) Appl. No.: 17/921,449

(22) PCT Filed: Apr. 28, 2021

(86) PCT No.: PCT/KR2021/005386
§ 371 (c)(1),
(2) Date: Oct. 26, 2022

(87) PCT Pub. No.: WO2021/221465
PCT Pub. Date: Nov. 4, 2021

(65) Prior Publication Data
US 2023/0158772 A1    May 25, 2023

(30) Foreign Application Priority Data
Apr. 29, 2020  (KR) ..................... 10-2020-0052731

(51) Int. Cl.
*B32B 5/32* (2006.01)
*B32B 38/08* (2006.01)
*E04F 15/10* (2006.01)

(52) U.S. Cl.
CPC ............... *B32B 5/32* (2013.01); *B32B 38/08* (2013.01); *E04F 15/107* (2013.01);
(Continued)

(58) Field of Classification Search
CPC ............ B32B 2250/05; B32B 2255/10; B32B 2255/26; B32B 2260/021;
(Continued)

(56) References Cited

U.S. PATENT DOCUMENTS

| 2005/0049341 A1* | 3/2005 | Grass ............... C08K 5/10 524/306 |
| 2006/0048464 A1 | 3/2006 | Suzuki et al. |

(Continued)

FOREIGN PATENT DOCUMENTS

| KR | 10-2005-0019529 A | 3/2005 |
| KR | 20050019529 A * | 3/2005 |

(Continued)

OTHER PUBLICATIONS

Translation of KR 20050019529A, Chang et al., Mar. 3, 2005. (Year: 2005).*

(Continued)

*Primary Examiner* — Hai Vo
(74) *Attorney, Agent, or Firm* — Morgan, Lewis & Bockius LLP

(57) ABSTRACT

The present invention relates to a multilayered flooring decorative material comprising a first foam layer and a second foam layer, wherein the first foam layer is formed by foaming a foam layer composition, the second foam layer is formed by impregnating a fiberglass substrate with a foam layer composition, and the foam layer composition comprises a polyvinyl chloride resin, a plasticizer, a filler, a heat-resistant stabilizer, and a foam stabilizer.

20 Claims, 1 Drawing Sheet

(52) U.S. Cl.
CPC ..... *B32B 2250/05* (2013.01); *B32B 2260/021* (2013.01); *B32B 2260/046* (2013.01); *B32B 2266/0235* (2013.01); *B32B 2305/022* (2013.01); *B32B 2305/22* (2013.01); *B32B 2307/308* (2013.01); *B32B 2451/00* (2013.01)

(58) Field of Classification Search
CPC ...... B32B 2260/046; B32B 2266/0235; B32B 2305/022; B32B 2305/22; B32B 2307/102; B32B 2307/308; B32B 2307/412; B32B 2307/56; B32B 2307/7246; B32B 2307/744; B32B 2451/00; B32B 2471/00; B32B 27/065; B32B 27/08; B32B 27/12; B32B 27/302; B32B 27/304; B32B 27/306; B32B 27/308; B32B 27/32; B32B 27/322; B32B 27/36; B32B 38/08; B32B 5/02; B32B 5/18; B32B 5/32; C08K 5/00; C08K 5/10; E04F 15/107
See application file for complete search history.

(56) References Cited

U.S. PATENT DOCUMENTS

| | | |
|---|---|---|
| 2018/0086035 A1 | 3/2018 | Yuon |
| 2023/0007825 A1* | 1/2023 | Christiaens ............... B32B 5/18 |

FOREIGN PATENT DOCUMENTS

| | | |
|---|---|---|
| KR | 10-2005-0057322 A | 6/2005 |
| KR | 10-1070048 B1 | 10/2011 |
| KR | 10-1102161 B1 | 1/2012 |
| KR | 10-2012-0064906 A | 6/2012 |
| KR | 10-2016-0003985 A | 1/2016 |
| KR | 10-2016-0045237 A | 4/2016 |
| KR | 10-2018-0032764 A | 4/2018 |
| KR | 10-2018-0117359 A | 10/2018 |
| KR | 20-2019-0002278 U | 9/2019 |

OTHER PUBLICATIONS

International Search Report issued in corresponding International Patent Application No. PCT/KR2021/005386 dated Aug. 5, 2021.

* cited by examiner

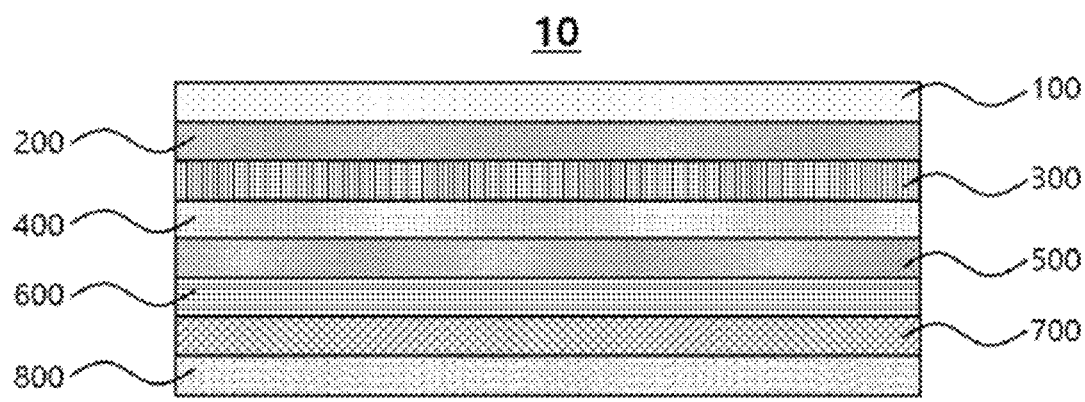

MULTILAYERED FLOORING DECORATIVE MATERIAL

TECHNICAL FIELD

The present invention relates to a multilayered flooring decorative material having excellent eco-friendliness due to less emission of volatile organic compounds (VOCs), and excellent moisture-proof property, cushioning property, non-slip property, anti-fungal property and shock absorption rate.

BACKGROUND ART

A conventional flooring decorative material generally includes a polyvinyl chloride (PVC)-based material and a phthalate-based plasticizer. However, the toxic phthalate-based plasticizer emits harmful substances such as environmental hormones and toxic gas (hydrogen chloride), and thus, there is a problem of the lack of eco-friendliness. In addition, a conventional tile-type flooring decorative material is generally attached to a coating surface of an adhesive after applying the adhesive to a substrate surface. However, the adhesive applied to the substrate surface generally has a disadvantage of emitting a large amount of VOCs.

In this regard, the Korean Patent Registration No. 1070048 (Patent Document 1), discloses a flooring decorative material including a surface coating layer, a transparent film layer, a printing layer, a first layer, a dimension reinforcement layer, a second layer, a balance layer and a cushion embossing layer from the top, in which the thickness of the cushion embossing layer is 10% to 70% of the total thickness of the layers summing the surface coating layer, the transparent film layer, the printing layer, the first layer, the dimension reinforcement layer, the second layer and the balance layer. However, the flooring decorative material of Patent Document 1 is a single cushion layer and has a limitation in that an impact absorption rate and an amount of light impact sound reduction are insufficient.

Further, the Korean Patent Registration No. 1102161 (Patent Document 2), discloses a flooring decorative material constituted by a surface coating layer, a transparent layer, a printing layer, a first layer, a dimension reinforcement cushion layer consisting of a cushion layer and a dimension reinforcement layer, a second layer and a balance layer, in which the dimension reinforcing layer is a layer in which a glass fiber sheet is impregnated with a vinyl chloride sol and then gelled, and the cushion layer is a layer in which a vinyl chloride foam sol is foamed. However, the flooring decorative material of Patent Document 2 is a single cushion embossing layer, and has a limit to a non-slip property and an amount of light impact sound reduction, and since a moisture-proof/non-slip cushion layer was not designed at the bottom of the flooring decorative material, there was a problem that moisture-proof, anti-fungal, and non-slip properties were insufficient.

Accordingly, there is a need for research and development on a multilayered flooring decorative material having excellent eco-friendliness due to less emission of volatile organic compounds (VOCs), and excellent moisture-proof property, cushioning property, non-slip property, anti-fungal property and shock absorption rate.

DISCLOSURE

Technical Problem

An object of the present invention is to provide a multilayered flooring decorative material having excellent eco-friendliness due to less emission of volatile organic compounds (VOCs), and excellent moisture-proof property, cushioning property, non-slip property, anti-fungal property and shock absorption rate.

Technical Solution

An aspect of the present invention provides a multilayered flooring decorative material comprising a first foam layer and a second foam layer, wherein
   the first foam layer is formed by foaming a foam layer composition,
   the second foam layer is formed by impregnating a fiberglass substrate with the foam layer composition, and
   the foam layer composition includes a polyvinyl chloride resin, a plasticizer, a filler, a heat-resistant stabilizer and a foam stabilizer.

Advantageous Effects

According to the present invention, the multilayered flooring decorative material has excellent eco-friendliness due to less emission of volatile organic compounds (VOCs), and excellent moisture-proof property, cushioning property, non-slip property, anti-fungal property and shock absorption rate.

DESCRIPTION OF DRAWINGS

FIG. 1 is a cross-sectional view of a multilayered flooring decorative material according to an exemplary embodiment of the present invention.

BEST MODE

Hereinafter, the present invention will be described in detail.

Throughout the specification, a case where a part "comprises" an element will be understood to imply the inclusion of stated elements but not the exclusion of any other elements unless explicitly described to the contrary.

In addition, in the specification, it will be understood that when a certain layer is located "on" the other layer, the certain layer is not only in contact with the other layer, but also has another layer between both layers.

A multilayered flooring decorative material according to the present invention includes a first foam layer and a second foam layer.

First Foam Layer and Second Foam Layer

The first foam layer and the second foam layer have pore structures and provide cushioning property to the flooring decorative material to improve the amount of press fit, an impact absorption rate and an amount of light impact sound reduction. In this case, the multilayered flooring decorative material according to the present invention has excellent cushioning property including two or more foam layers. In the case of including one foam layer, the cushioning property of the prepared flooring decorative material may be insufficient, so that the impact absorption rate and the amount of light impact sound reduction may be insufficient.

The first foam layer is formed by foaming a foam layer composition, and the second foam layer is formed by impregnating a fiberglass substrate with the foam layer composition. In this case, the foam layer composition includes a polyvinyl chloride resin, a plasticizer, a filler, a heat-resistant stabilizer and a foam stabilizer.

Polyvinyl Chloride (PVC) Resin

The polyvinyl chloride resin is a main resin of the foam layer.

The polyvinyl chloride resin may have a polymerization degree of 1,000 to 2,000, 1,100 to 1,900, or 1, 200 to 1,800. When the polymerization degree of the polyvinyl chloride resin is less than the above range, there may be a problem that the strength and elasticity of the prepared flooring decorative material are insufficient due to the low binding strength of the composition, so that the mechanical properties, the impact absorption rate, and the amount of light impact sound reduction are reduced. When the polymerization degree exceeds the above range, there may be a problem that the binding strength of the composition is excessively high, so that workability and processability are insufficient.

In addition, the polyvinyl chloride resin may have a weight average molecular weight (Mw) of 130,000 to 250,000 g/mol. For example, the resin may have a weight average molecular weight of 140,000 to 240,000 g/mol, or 150,000 to 230,000 g/mol. When the weight average molecular weight of the polyvinyl chloride resin is less than the above range, there may be a problem that the viscosity of the composition is low and the elasticity is insufficient so that a non-slip property is insufficient. When the weight average molecular weight exceeds the above range, there may be a problem that the viscosity of the composition is high and the elasticity is lowered, so that workability and appearance may be deteriorated.

The polyvinyl chloride resin may be included in the composition in an amount of 35 to 55 parts by weight, or 40 to 50 parts by weight with respect to 30 to 50 parts by weight of the plasticizer. When the content of the polyvinyl chloride resin is less than the above range, the viscosity of the composition is low and the mechanical properties of the prepared flooring decorative material are lowered. When the content exceeds the above range, there may be a problem that the viscosity of the composition becomes excessively high, so that the appearance and workability of the prepared flooring decorative material are deteriorated. The parts by weight of the polyvinyl chloride resin may be based on 100 parts by weight of the composition.

Plasticizer

The plasticizer serves to impart flexibility to the foam layer and increase processability.

The foam layer does not include regulated phthalates, and as a result, the composition has excellent environmental friendliness. For example, the regulated phthalates may be included in an amount of less than 0.1 wt % with respect to the total weight of the foam layer. In this case, the "regulated phthalates" refer to phthalate-based materials classified as regulated materials according to a RoHS guideline and the like.

The regulated phthalates may include, for example, di-2-ethylhexyl phthalate (DEHP), di-isononyl phthalate (DINP), butyl benzyl phthalate (BBP), di-isodecyl phthalate (DIDP), di-n-octyl phthalate (DNOP), di-butyl phthalate (DBP), and the like.

In addition, the plasticizer may include a plasticizer other than the regulated phthalates, and may include one or more selected from the group consisting of, for example, dioctyl terephthalate (DOTP), 1,2-cyclohexane dicarboxylic acid diisononyl ester (DINCH) and dipropylheptylphthalate (DPHP).

The plasticizer may be included in the composition in an amount of 30 to 50 parts by weight, or 35 to 45 parts by weight with respect to 35 to 55 parts by weight of the polyvinyl chloride resin. When the content of the plasticizer is less than the above range, there may be a problem that the viscosity of the composition may be high so that processability is lowered, and when the content exceeds the above range, there may be a problem that the hardness of the prepared floor decorative material is lowered due to an excess of plasticizer. The parts by weight of the plasticizer may be based on 100 parts by weight of the composition.

Filler

The filler serves to impart a sense of weight to the flooring decorative material and to increase the workability of the foam layer.

The filler may include one or more selected from the group consisting of calcium carbonate, titanium dioxide, alumina, aluminum oxide and silica.

In addition, the filler may have an average diameter of 1 to 50 μm, or 5 to 20 μm. When the average diameter of the filler is less than the above range, there may be a problem that the viscosity of the composition is increased so that the workability is lowered, and when the average diameter exceeds the above range, there may be a problem that the mechanical properties of the prepared flooring decorative material are lowered.

The filler may be included in the foam layer in an amount of 1 to 20 parts by weight, or 5 to 15 parts by weight with respect to 35 to 55 parts by weight of the polyvinyl chloride resin. When the content of the filler is less than the above range, there may be a problem that an effect by the filler is insufficient so that economic feasibility is lowered and processability is deteriorated, and when the content exceeds the above range, there may be a problem that the elasticity of the prepared flooring decorative material is lowered so that mechanical properties are insufficient. The parts by weight of the filler may be based on 100 parts by weight of the composition.

Heat-Resistant Stabilizer

The heat-resistant stabilizer serves to improve the heat resistance of the foam layer.

The heat-resistant stabilizer is not particularly limited as long as the heat-resistant stabilizer is a heat-resistant stabilizer that can be typically used for flooring decorative materials, and may include, for example, stearic acid, metallic stearate, and the like. The metallic stearate may include, for example, calcium stearate, magnesium stearate, barium stearate, zinc stearate, or the like.

In addition, the heat-resistant stabilizer may be included in the foam layer in an amount of 0.5 to 7 parts by weight, or 1 to 5 parts by weight with respect to 35 to 55 parts by weight of the polyvinyl chloride resin. When the content of the heat-resistant stabilizer is less than the above range, there may be a problem that an effect of improving the heat resistance of the flooring decorative material is insufficient as an effect due to the addition of the heat-resistant stabilizer, and when the content exceeds the above range, there may be a problem that the processability of the composition may be deteriorated and the economic feasibility is deteriorated. The parts by weight of the heat-resistant stabilizer may be based on 100 parts by weight of the composition.

Foam Stabilizer

The foam stabilizer serves to impart moisture-proof properties to the foam layer and prevent the pores from being broken during foaming.

The foam stabilizer is not particularly limited as long as the foam stabilizer can be generally used in the foam layer. For example, the foam stabilizer may be silicones, and include BYK 8070 and BYK 8020 manufactured by Byk Chemie, SYNTHAMID 218 by Th. Boehme GmbH, etc., as commercially available products.

In addition, the foam stabilizer may be included in the foam layer in an amount of 1 to 10 parts by weight, or 2 to 7 parts by weight with respect to 35 to 55 parts by weight of the polyvinyl chloride resin. When the content of the foam stabilizer is less than the above range, there may be a problem that it is not easy to form pores so that the pores in the foam layer are insufficient, and the cushioning property of the prepared floor decorative material is insufficient so that the impact absorption rate, the amount of light impact sound reduction, and the like are insufficient. When the content exceeds the above range, there may be a problem that the processability and interlayer adhesion of the composition are lowered, so that mechanical properties and lower productivity are deteriorated. The parts by weight of the foam stabilizer may be based on 100 parts by weight of the composition.

The first foam layer has a non-slip property to be attached to the substrate surface without an adhesive, which is excellent in eco-friendliness, and has waterproof properties to improve a problem of shrinkage and/or expansion of the flooring decorative material due to moisture absorbed from the substrate surface and improve the anti-fungal property of the flooring decorative material.

The first foam layer is formed by foaming the foam layer composition. Specifically, the first foam layer may be formed by foaming the foam layer composition by a mechanical method. In this case, the mechanical foaming method may be performed, for example, by stirring while injecting air into the foam layer composition to form pores. Specifically, the foam layer composition of the first foam layer is foamed by a mechanical foaming method, not a chemical foaming method, so that the thickness can be uniformly adjusted after foaming, and is eco-friendly without volatile organic compounds (VOCs) generated from a chemical foaming agent.

In addition, the second foam layer is formed by impregnating a fiberglass substrate with the foam layer composition. When the second foam layer includes the fiberglass substrate as described above, there is an effect of suppressing deformation due to a dimensional change of the flooring decorative material.

Specifically, the second foam layer may be formed by mechanically foaming the foam layer composition and then impregnating the fiberglass substrate with the foam layer composition. In this case, the fiberglass substrate is not particularly limited as long as the fiberglass substrate is a fiberglass substrate applicable to a conventional flooring decorative material, but may be, for example, a basis weight of 10 to 100 g/m$^2$, or 30 to 70 g/m$^2$.

The first foam layer and the second foam layer may each independently have a foaming magnitude of 150% to 350% or 200% to 300%. When the foaming magnitudes of the first foam layer and the second foam layer are less than the above range, respectively, there may be a problem that the pores in the foam layer are insufficient so that physical properties such as the impact absorption rate and the amount of light impact sound reduction of the flooring decorative material are insufficient. When the foaming magnitudes of the first foam layer and the second foam layer exceed the above range, there may be a problem that the pores in the foam layer are excessively increased, so that the mechanical strength of the floor decorative material is poor. At this time, the foaming magnitude of 200% means that, if the density of the composition before stirring was 1 g/cm$^3$, the density of the composition becomes 0.5 g/cm$^3$ to be decreased two times after stirring while injecting air.

In addition, the first foam layer may have an average thickness of 0.5 to 2.0 mm or 0.7 to 1.5 mm, and the second foam layer may have an average thickness of 0.1 to 1.5 mm or 0.3 to 1 mm. When the average thickness of each of the first foam layer and the second foam layer is less than the above range, there may be a problem that the cushioning property and the impact absorption rate are reduced due to the small thickness, and when the average thickness thereof exceeds the above range, the thickness of the foam layer of the prepared flooring decorative material may be increased, so that the mechanical strength may be deteriorated.

The flooring decorative material may include a form in which a first foam layer, a balance layer, a lower layer, a second foam layer, a middle layer, a printing layer, a transparent layer, and a surface coating layer are sequentially stacked. Referring to FIG. 1, a multilayered flooring decorative material 10 according to the present invention may include a form in which a first foam layer 800, a balance layer 700, a lower layer 600, a second foam layer 500, a middle layer 400, a printing layer 300, a transparent layer 200, and a surface coating layer 100 are sequentially stacked.

Balance Layer

The balance layer is seated on a bottom surface and serves to provide an anti-curling function to the flooring decorative material.

The balance layer is not particularly limited as long as the balance layer is a balance layer that can be used for a conventional flooring decorative material, and may include, for example, a polyethylene resin, a polypropylene resin, an acrylonitrile butadiene styrene (ABS) resin, a polyvinyl chloride resin, an acrylic resin, a polyester resin, a polystyrene resin, polytetrafluoroethylene, an ethylene vinyl acetate copolymer, an ethylene propylene copolymer, and the like.

In addition, the balance layer may have an average thickness of 0.1 to 1.5 mm, or 0.1 to 1.0 mm. When the average thickness of the balance layer is less than the above range, there may be a problem that the thickness of the balance layer is thin, so that the curling prevention and noise prevention effects of the flooring decorative material are insufficient. When the average thickness thereof exceeds the above range, there may be a problem that the thickness of the balance layer is too thick, so that economic feasibility is lowered and appearance and workability are deteriorated.

Lower Layer

The lower layer is seated on the bottom surface and serves to provide a noise prevention function, stability, dimensional stability, and a curling prevention function to the flooring decorative material.

The lower layer is not particularly limited as long as the lower layer is a lower layer that can be used for a conventional flooring decorative material, and may include, for example, a polyethylene resin, a polypropylene resin, an ABS resin, a polyvinyl chloride resin, an acrylic resin, a polyester resin, a polystyrene resin, polytetrafluoroethylene, an ethylene vinyl acetate copolymer, an ethylene propylene copolymer, and the like.

In addition, the lower layer may have an average thickness of 1 to 5 mm, or 2 to 4 mm. When the average thickness of the lower layer is less than the above range, there may be a problem that noise prevention, dimensional stability and mechanical properties of the prepared flooring decorative material are deteriorated. When the average thickness thereof exceeds the above range, there may be a problem that the weight of the prepared flooring material becomes heavy so that economical efficiency is deteriorated, and the thickness of the flooring material becomes excessively thick, so that appearance and workability are deteriorated.

Middle Layer

The middle layer serves to provide a noise prevention function, stability, dimensional stability, and a curling prevention function to the flooring decorative material.

The middle layer is not particularly limited as long as the middle layer is a middle layer that can be used for a conventional flooring decorative material, and may include, for example, a polyethylene resin, a polypropylene resin, an ABS resin, a polyvinyl chloride resin, an acrylic resin, a polyester resin, a polystyrene resin, polytetrafluoroethylene, an ethylene vinyl acetate copolymer, an ethylene propylene copolymer, and the like.

In addition, the middle layer may have an average thickness of 0.1 to 2 mm, or 0.2 to 1 mm. When the average thickness of the middle layer is less than the above range, there may be a problem that noise prevention, dimensional stability and mechanical properties of the prepared flooring decorative material may be deteriorated. When the average thickness thereof exceeds the above range, there may be a problem that the thickness of the prepared flooring decorative material becomes thick, so that economical efficiency is deteriorated and appearance and workability are lowered.

Printing Layer

The printing layer serves to impart a visual effect to the flooring decorative material.

The printing layer is not particularly limited as long as the printing layer is a printing layer that can be used for a conventional flooring decorative material, and a printed pattern may be formed by a method such as gravure printing or transfer printing.

In addition, the printing layer may have an average thickness of 0.05 to 0.5 mm, or 0.08 to 0.3 mm. When the average thickness of the printing layer is less than the above range, there may be a problem that the thickness of the printing layer is too thin and thus, the hiding force of the flooring decorative material is lowered, so that the color of the lower layer is visible. When the average thickness thereof exceeds the above range, there may be a problem that the thickness of the printing layer is too thick, and thus, the color of the printed pattern is darkened, so that economic feasibility is lowered.

Transparent Layer

The transparent layer has excellent durability to protect the printing layer and serves to provide a three-dimensional effect.

The transparent layer is not particularly limited as long as the transparent layer is a transparent layer that can be used for a conventional flooring decorative material, and may include, for example, a polyethylene resin, a polypropylene resin, an ABS resin, a polyvinyl chloride resin, an acrylic resin, a polyester resin, a polystyrene resin, polytetrafluoroethylene, an ethylene vinyl acetate copolymer, an ethylene propylene copolymer, and the like.

In addition, the transparent layer may have an average thickness of 0.1 to 1.0 mm, or 0.3 to 0.7 mm. When the average thickness of the transparent layer is less than the above range, there may be a problem that the durability of the prepared flooring decorative material is insufficient, and when the average thickness thereof exceeds the above range, there may be a problem that the appearance characteristics of the prepared flooring decorative material are reduced and economic feasibility is deteriorated.

Surface Coating Layer

The surface coating layer serves to impart physical properties such as fouling resistance and scratch resistance of the surface of the flooring decorative material.

The surface coating layer is not particularly limited as long as the surface coating layer can be applied to a conventional flooring decorative material, and for example, may be prepared from an ultraviolet curable resin composition such as an acrylate-based resin.

In addition, the surface coating layer may have an average thickness of 2 to 30 μm, or 5 to 20 μm. When the average thickness of the surface coating layer is less than the above range, there may be a problem that the thickness of the surface coating layer is thin, so that the scratch resistance and fouling resistance effects of the flooring decorative material are insufficient. When the average thickness thereof exceeds the above range, there may be a problem that the thickness of the surface coating layer is too thick, so that the three-dimensional effect and appearance characteristics of the flooring decorative material are deteriorated, and the economic feasibility is lowered.

The multilayered flooring decorative material may have a total volatile organic compound (TVOC) emission amount of 0.1 mg/m$^2$·hr or less, and an average thickness of 1 to 10 mm, or 3 to 7 mm.

The multilayered flooring decorative material may have an impact absorption rate of 7% or more, 8% or more, or 8 to 15%, measured according to a method of KS M 3888-1, and have an amount of light impact sound reduction of 10 db or more, 12 db or more, or 13 to 20 db, measured according to a method of KS F 2865.

As described above, the multilayered flooring decorative material according to the present invention has excellent eco-friendliness due to less emission of volatile organic compounds (VOCs), and excellent moisture-proof property, cushioning property, non-slip property, anti-fungal property and shock absorption rate.

Modes for the Invention

Hereinafter, the present invention will be described in more detail through Examples. However, these Examples are just to help in the understanding of the present invention and the scope of the present invention is not limited to these Examples in any meaning.

Example 1. Preparation of Multilayered Flooring Decorative Material 1-1: Preparation of Second Foam Layer 47 parts by weight of a polyvinyl chloride resin (degree of polymerization: 1700, weight average molecular weight: 220,000 g/mol), 41 parts by weight of dioctyl terephthalate as a plasticizer, 9 parts by weight of calcium carbonate (white powder with an average diameter of 10 μm) as a filler, 1 part by weight of a mixture of barium stearate and zinc stearate in a weight ratio of 1:2 as a heat-resistant stabilizer, and 2 parts by weight of BYK 8020 of Byk Chemie as a foam stabilizer were mixed and mechanically foamed to prepare a foam layer composition having a foaming magnitude of 200%.

Thereafter, a fiberglass substrate having a basis weight of 50 g/m$^2$ was impregnated with the 200%-foamed foam layer composition and gelled in a 170° C. gelling drum to form a second foam layer having an average thickness of 0.6 mm.

1-2: Preparation of First Foam Layer

The 200% foamed foam layer composition of Example 1-1 was coated on a balance layer (see the composition in Table 1 and the thickness in Table 2) wound by calendaring and foamed by a gelling method for 2 minutes in a 180° C. drying oven to form a first foam layer of an average thickness of 1.1 mm.

1-3: Multilayered Flooring Decorative Material

A flooring decorative material in a form as shown in FIG. 1 was prepared, and each layer was prepared by a calendaring method. At this time, the thickness of each layer was shown in Table 2.

Specifically, each layer was mixed with the components and composition ratios shown in Table 1 below, and the mixed raw materials were heated and pressurized to be uniformly first gelled, and then second gelled using an extruder.

At this time, the polyvinyl chloride resin had a polymerization degree of 1,000 and a weight average molecular weight of 130,000 g/mol, dioctyl terephthalate was used as a plasticizer, and calcium carbonate (white powder with an average diameter of 10 μm) was used as a filler, a mixture of barium stearate and zinc stearate in a weight ratio of 1:2 was used as a heat-resistant stabilizer, $TiO_2$ was used as a pigment, and Dow's BTA-751U was used as an impact modifier.

In addition, a surface treatment layer was formed by coating a urethane acrylate-based resin (manufacturer: POLYNETRON, product name: PN-3336) as a photocurable resin and curing the resin with ultraviolet rays.

TABLE 1

| Component (parts by weight) | Transparent layer | Printing layer | Middle layer | Lower layer | Balance layer |
|---|---|---|---|---|---|
| Polyvinyl chloride resin | 80 | 83 | 22 | 19 | 44 |
| Plasticizer | 18 | 8 | 10 | 9 | 10 |
| Filler | — | — | 67 | 70 | 44 |
| Heat-resistant stabilizer | 2 | 1 | 1 | 1 | 2 |
| Foam stabilizer | — | — | — | — | — |
| Impact modifier | — | — | — | 1 | — |
| Pigment | — | 8 | — | — | — |

TABLE 2

| Classification (mm) | Example 1 |
|---|---|
| Surface coating layer | 0.01 |
| Transparent layer | 0.5 |
| Printing layer | 0.09 |
| Middle layer | 0.5 |
| Second foam layer | 0.6 |
| Lower layer | 2.0 |
| Balance layer | 0.2 |
| First foam layer | 1.1 |
| Total thickness | 5.0 |

Examples 2 to 10 and Comparative Examples 1 and 2

The multilayered flooring decorative material was prepared in the same manner as in Example 1, except that the composition of the foam layer was adjusted as described in Table 3.

TABLE 3

| | Composition of foam layer | | | | | |
|---|---|---|---|---|---|---|
| Component (parts by weight) | Polyvinyl chloride resin | Plasticizer | Filler | Heat-resistant stabilizer | Foam stabilizer | Total amount |
| Example 1 | 47 | 41 | 9 | 1 | 2 | 100 |
| Example 2 | 42 | 40 | 10 | 1 | 7 | 100 |
| Example 3 | 48 | 41 | 9 | 1 | 1 | 100 |
| Example 4 | 42 | 37 | 10 | 1 | 10 | 100 |
| Example 5 | 43 | 41 | 9 | 5 | 2 | 100 |
| Example 6 | 43 | 38 | 9 | 7 | 3 | 100 |
| Example 7 | 47 | 42.5 | 9 | 1 | 0.5 | 100 |
| Example 8 | 42 | 37 | 8 | 1 | 12 | 100 |
| Example 9 | 46 | 41 | 9.9 | 0.1 | 3 | 100 |
| Example 10 | 43 | 37 | 9 | 8 | 3 | 100 |
| Comparative Example 1 | 47 | 43 | 9 | 1 | — | 100 |
| Comparative Example 2 | 47 | 41 | 9 | — | 3 | 100 |

Comparative Example 3

A multilayered flooring decorative material was prepared in the same manner as in Example 1, except that a glass fiber impregnating layer having an average thickness of 0.6 mm was formed on the lower layer instead of the second foam layer.

Specifically, 47 parts by weight of a polyvinyl chloride resin (degree of polymerization: 1700, weight average molecular weight: 220,000 g/mol), 41 parts by weight of dioctyl terephthalate as a plasticizer, 9 parts by weight of calcium carbonate (white powder with an average diameter of 10 μm) as a filler, and 1 part by weight of a mixture of barium stearate and zinc stearate in a weight ratio of 1:2 as a heat-resistant stabilizer were mixed to prepare a non-foam composition. Thereafter, a fiberglass substrate having a basis weight of 50 g/m² was impregnated with the non-foam composition and gelled in a 170° C. gelling drum to form a glass fiber impregnating layer having an average thickness of 0.6 mm.

Comparative Example 4

A multilayered flooring decorative material was prepared in the same manner as in Example 1, except for forming a non-foam layer having an average thickness of 1.1 mm instead of the first foam layer.

Specifically, 47 parts by weight of a polyvinyl chloride resin (degree of polymerization: 1700, weight average molecular weight: 220,000 g/mol), 41 parts by weight of dioctyl terephthalate as a plasticizer, 9 parts by weight of calcium carbonate (white powder with an average diameter of 10 μm) as a filler, and 1 part by weight of a mixture of barium stearate and zinc stearate in a weight ratio of 1:2 as a heat-resistant stabilizer were mixed to prepare a non-foam composition. Then, the non-foam composition was applied and dried to prepare and use a non-foam layer having an average thickness of 1.1 mm.

Experimental Examples: Evaluation of Characteristics of Multilayered Flooring Decorative Material The multilayered flooring decorative materials of Examples and Comparative Examples were measured in the following methods and the results were shown in Table 4.

(1) Length Change Rate (%) by Absorption

The multilayered flooring decorative material was immersed in water and treated at 80° C. for 6 hours, and then cooled for 1 hour at room temperature, and length change rate of the multilayered flooring decorative material was calculated based on an initial length of the flooring decorative material.

(2) Curl by Absorption

The multilayered flooring decorative material was immersed in water and treated at 80° C. for 6 hours, and then cooled for 1 hour at room temperature, and the vertically bending degree of the flooring decorative material was measured based on an initial condition of the flooring decorative material.

(3) Anti-Fungal Property

The anti-fungal property was measured according to a method of ASTM G 21, and the evaluation criteria were also in accordance with the standards described in ASTM G21.

(4) Non-Slip Property

The non-slip property was measured according to a method of KS M 3802.

(5) Impact Absorption Rate

The impact absorption rate was measured according to a method of KS M 3888-1.

(6) Amount of Light Impact Sound Reduction

The amount of light impact sound reduction was measured according to a method of KS F 2865.

TABLE 4

|  | Length change rate (%) by absorption | Curl (mm) by absorption | Anti-fungal property | Non-slip property | Impact absorption rate (%) | Amount of light impact sound reduction (dB) |
| --- | --- | --- | --- | --- | --- | --- |
| Example 1 | 0.02 | 1 | Grade 0 | 0.7 | 10 | 16 |
| Example 2 | 0.02 | 1 | Grade 0 | 0.7 | 10 | 16 |
| Example 3 | 0.02 | 1 | Grade 0 | 0.6 | 9 | 15 |
| Example 4 | 0.03 | 1 | Grade 0 | 0.7 | 10 | 16 |
| Example 5 | 0.02 | 1 | Grade 0 | 0.7 | 10 | 16 |
| Example 6 | 0.15 | 2 | Grade 0 | 0.7 | 10 | 16 |
| Example 7 | 0.3 | 2 | Grade 2 | 0.5 | 8 | 15 |
| Example 8 | 0.27 | 3 | Grade 1 | 0.7 | 9 | 15 |
| Example 9 | 0.4 | 2 | Grade 2 | 0.5 | 8 | 13 |
| Example 10 | 0.32 | 3 | Grade 3 | 0.4 | 7 | 14 |
| Comparative Example 1 | 0.5 | 5 | Grade 3 | 0.2 | 6 | 8 |
| Comparative Example 2 | 0.42 | 4 | Grade 3 | 0.5 | 6 | 12 |
| Comparative Example 3 | 0.4 | 1 | Grade 0 | 0.7 | 5 | 9 |
| Comparative Example 4 | 0.5 | 2 | Grade 3 | 0.2 | 5 | 9 |

As illustrated in Table 4, the multilayered flooring decorative material of Example was excellent in the length change rate and curl by absorption, the anti-fungal property, the non-slip property, the impact absorption rate and the amount of light impact sound reduction.

On the other hand, the flooring decorative material of Comparative Example 1, which did not include the foam stabilizer in the foam layer, was insufficient in all of the length change rate and curl by absorption, the anti-fungal property, the non-slip property, the impact absorption rate and the amount of light impact sound reduction.

Further, the flooring decorative material of Comparative Example 2, which did not include the heat-resistant stabilizer in the foam layer, was insufficient in all of the length change rate and curl by absorption, the anti-fungal property, the impact absorption rate and the amount of light impact sound reduction.

In addition, the flooring decorative material of Comparative Example 3, which did not include the foam stabilizer in the second foam layer, but applied the non-foam layer, was insufficient in the impact absorption rate and the amount of light impact sound reduction.

In addition, the flooring decorative material of Comparative Example 4, which did not include the foam stabilizer in the first foam layer, but applied the non-foam layer, was insufficient in the length change rate by absorption, the anti-fungal property, the non-slip property, the impact absorption rate and the amount of light impact sound reduction.

The invention claimed is:

1. A multilayered flooring decorative material comprising a first foam layer and a second foam layer, wherein
the first foam layer is formed by foaming a foam layer composition by a mechanical method,
the second foam layer is formed by mechanically foaming the foam layer composition and then impregnating a fiberglass substrate with the foam layer composition, and
the foam layer composition comprises 40 to 50 parts by weight of a polyvinyl chloride resin, 35 to 45 parts by weight of a plasticizer, 5 to 15 parts by weight of a filler, 1 to 5 parts by weight of a heat-resistant stabilizer and 1 to 10 parts by weight of a silicone foam stabilizer, wherein the polyvinyl chloride resin has a weight average molecular weight (MW) of 150,000 to 230,000 g/mol,
wherein the heat-resistant stabilizer is at least one selected from the group consisting of stearic acid and metallic stearate, and
wherein the multilayered flooring decorative material has a length change rate by absorption of 0.02 to 0.03%.

2. The multilayered flooring decorative material of claim 1, wherein the polyvinyl chloride resin has a polymerization degree of 1,000 to 2,000.

3. The multilayered flooring decorative material of claim 1, wherein the plasticizer comprises one or more selected from the group consisting of dioctyl terephthalate (DOTP), 1,2-cyclohexane dicarboxylic acid diisononyl ester (DINCH) and dipropylheptylphthalate (DPHP).

4. The multilayered flooring decorative material of claim 1, wherein the multilayered flooring decorative material comprises a form in which the first foam layer, a balance layer, a lower layer, the second foam layer, a middle layer, a printing layer, a transparent layer, and a surface coating layer are sequentially stacked.

5. The multilayer flooring decorative material of claim 4, wherein the balance layer has an average thickness of 0.1 to 1.5 mm.

6. The multilayer flooring decorative material of claim 4, wherein the lower layer comprises one or more selected from the group consisting of a polyethylene resin, a polypropylene resin, an ABS resin, a polyvinyl chloride resin, an acrylic resin, a polyester resin, a polystyrene resin, polytetrafluoroethylene, an ethylene vinyl acetate copolymer, and an ethylene propylene copolymer.

7. The multilayer flooring decorative material of claim 4, wherein the lower layer has an average thickness of 1 to 5 mm.

8. The multilayered flooring decorative material of claim 1, wherein the foam layer composition excludes a chemical foaming agent.

9. The multilayer flooring decorative material of claim 1, wherein the foam layer composition comprises 2-7 parts by weight of a silicone foam stabilizer.

10. The multilayer flooring decorative material of claim 1, wherein the foam layer excludes regulated phthalates.

11. The multilayer flooring decorative material of claim 1, wherein the foam layer comprises calcium stearate.

12. The multilayer flooring decorative material of claim 1, wherein the foam layer comprises magnesium stearate.

13. The multilayer flooring decorative material of claim 1, wherein the foam layer comprises barium stearate.

14. The multilayer flooring decorative material of claim 1, wherein the foam layer comprises zinc stearate.

15. The multilayer flooring decorative material of claim 1, wherein the first foam layer has an average thickness of 0.5 to 2.0 mm.

16. The multilayer flooring decorative material of claim 1, wherein the first foam layer has an average thickness of 0.7 to 1.5 mm.

17. The multilayer flooring decorative material of claim 1, wherein the second foam layer has an average thickness of 0.1 to 1.5 mm.

18. The multilayer flooring decorative material of claim 1, wherein the second foam layer has an average thickness of 0.1 to 1.5 mm.

19. The multilayer flooring decorative material of claim 1, wherein the second foam layer has an average thickness of 0.3 to 1 mm.

20. The multilayer flooring decorative material of claim 4, wherein the balance layer comprises one or more selected from the group consisting of a polyethylene resin, a polypropylene resin, an acrylonitrile butadiene styrene (ABS) resin, a polyvinyl chloride resin, an acrylic resin, a polyester resin, a polystyrene resin, polytetrafluoroethylene, an ethylene vinyl acetate copolymer, and an ethylene propylene copolymer.

* * * * *